(12) United States Patent
Takayanagi

(10) Patent No.: US 7,764,527 B2
(45) Date of Patent: Jul. 27, 2010

(54) SWITCHING POWER SUPPLY UNIT

(75) Inventor: Yoshinobu Takayanagi, Tokyo (JP)

(73) Assignee: TDK Corporation, Tokyo (JP)

( * ) Notice: Subject to any disclaimer, the term of this patent is extended or adjusted under 35 U.S.C. 154(b) by 258 days.

(21) Appl. No.: 12/071,134

(22) Filed: Feb. 15, 2008

(65) Prior Publication Data
US 2008/0198632 A1 Aug. 21, 2008

(30) Foreign Application Priority Data
Feb. 20, 2007 (JP) ............... 2007-039551

(51) Int. Cl.
*H02M 3/335* (2006.01)
*G05F 1/577* (2006.01)
(52) U.S. Cl. .................... 363/65; 323/267; 363/16
(58) Field of Classification Search .......... 363/15, 363/16, 17, 65; 323/267
See application file for complete search history.

(56) References Cited
U.S. PATENT DOCUMENTS
4,719,550 A * 1/1988 Powell et al. ............ 363/37
7,450,401 B2 * 11/2008 Iida ........................ 363/16

FOREIGN PATENT DOCUMENTS
| JP | A-2-502421 | 8/1990 |
| JP | A 08-317508 | 11/1996 |
| JP | A-2001-37226 | 2/2001 |
| JP | A-2003-153597 | 5/2003 |
| WO | WO 89/06062 A1 | 6/1989 |

* cited by examiner

*Primary Examiner*—Gary L Laxton
(74) *Attorney, Agent, or Firm*—Oliff & Berridge, PLC

(57) ABSTRACT

A switching power supply unit is provided, in which input terminals of an AC voltage can be made common to output terminals of an AC voltage. A first switching circuit is provided between a winding of a transformer and a main battery. A second switching circuit is provided between another winding of the transformer and input/output terminals. A third switching circuit is provided between the second switching circuit and the input/output terminals. Each of the first to third switching circuits includes a bidirectional switch (configured of a pair of one switching element and one diode connected in parallel to each other). A circuit for outputting an AC output voltage can be common to a circuit for inputting an AC input voltage to charge the main battery.

3 Claims, 10 Drawing Sheets

SWITCHING POWER SUPPLY UNIT

CROSS REFERENCE TO RELATED APPLICATIONS

The present invention contains subject matter related to Japanese Patent Application JP 2007-39551 filed in the Japanese Patent Office on Feb. 20, 2007, the entire contents of which being incorporated herein by reference.

BACKGROUND OF THE INVENTION

1. Field of the Invention

The present invention relates to a switching power supply unit configured to produce switching output obtained by switching DC input voltage at an output winding of a power conversion transformer.

2. Background Art

Generally, an electric vehicle is equipped with a low voltage battery (accessory battery) for outputting a low DC voltage such as about 14 V as a power supply for driving in-vehicle devices (accessories) such as a wiper, a headlight, a room light, an audio device, an air conditioner, and various measuring instruments, and equipped with a high voltage battery (main battery) for outputting a high DC voltage such as about 350 to 500 V as a power supply for driving a motor. Typically, such a low voltage battery is charged by rectifying an AC output voltage from an AC generator driven in terms of rotation of an engine so as to obtain a high DC voltage, and converting such a DC input voltage into a relatively low DC voltage by using a switching power supply unit (DC/DC converter), and then supplying the low DC voltage to the low voltage battery. The high voltage battery is charged by supplying the DC input voltage from an engine side to the high voltage battery. For example, as described in Japanese Unexamined Patent Publication No. 8-317508, the switching power supply unit performs voltage conversion by temporarily converting a DC input voltage into an AC voltage using an inverter circuit, then transforming the AC voltage using a voltage conversion transformer and reconverting the transformed AC voltage into a DC voltage using a rectifier circuit or the like.

SUMMARY OF THE INVENTION

The Japanese Unexamined Patent Publication No. 8-317508 further discloses a switching power supply unit having a function of inputting an AC voltage from a so-called commercial power supply to charge a high voltage battery and a low voltage battery. According to such a switching power supply unit, it is considered that, for example, when the unit is applied to an electric vehicle, even if an engine is stopped and therefore a DC input voltage is not supplied to the high voltage battery, the high voltage battery can be charged.

For example, when such a switching power supply unit is applied to the electric vehicle, output of a commercial power voltage being an AC voltage is sometimes required to activate electric devices at engine start and during car running.

It has been thus required that a circuit for inputting an AC voltage from a commercial power supply so as to charge a battery is made common to a circuit for outputting a commercial AC power voltage, and also that input terminals of an AC voltage are made common to output terminals of an AC voltage.

In view of forgoing, it is desirable to provide a switching power supply unit in which input terminals of an AC voltage can be made common to output terminals of an AC voltage.

A switching power supply unit of an embodiment of the invention includes a transformer including a first transformer coil and a second transformer coil magnetically coupled to each other, first to third switching circuits, and control sections controlling the first to third switching circuits. The first switching circuit is disposed between the first transformer coil and a first DC power supply, and is a bidirectional switching circuit configured to include at least one switch array configured of a pair of switches connected in series. The second switching circuit is disposed between the second transformer coil and AC voltage input/output terminals, and is a bidirectional switching circuit configured such that switch arrays are connected in parallel to each other, each of the switch arrays being configured of a pair of switches connected in series. The third switching circuit is disposed between the second switching circuit and the AC voltage input/output terminals, and is a bidirectional switching circuit configured to include at least one switch array configured of a pair of switches connected in series.

In the switching power supply unit of an embodiment of the invention, when a DC input voltage is inputted from the first DC power supply, the DC input voltage is converted into a pulse voltage by the first switching circuit, and the pulse voltage is transformed by the transformer. The transformed pulse voltage is rectified by the second switching circuit, the rectified voltage is converted into an AC output voltage by the third switching circuit, and the AC output voltage is outputted from the AC voltage input/output terminals. On the other hand, when an AC input voltage is inputted from the AC voltage input/output terminals, the AC input voltage is converted into a DC voltage by the third switching circuit, then a pulse voltage is generated based on the DC voltage by the second switching circuit, and the pulse voltage is transformed by the transformer. The transformed pulse voltage is rectified by the first switching circuit, and a DC output voltage is thus supplied to the first DC power supply. That is, since each of the first to third switching circuits is configured of a bidirectional switching circuit, a circuit for outputting an AC voltage can be made common to a circuit for inputting an AC voltage to charge a battery. The "AC output voltage" and the "AC input voltage" include a voltage used for a power voltage of electric devices. The included voltage is preferably used for such a so-called commercial power supply.

The switching power supply unit of an embodiment of the invention can be configured such that the control section controls the switching circuits such that in output mode where an AC output voltage is outputted from the AC voltage input/output terminals based on a DC input voltage supplied from the first DC power supply, the first and third switching circuits perform DC/AC conversion, and the second switching circuit performs rectification, and in input mode where a DC output voltage is supplied into the first DC power supply based on an AC input voltage inputted from the AC voltage input/output terminals, the third switching circuit performs AC/DC conversion, and the second switching circuit performs DC/AC conversion, and the first switching circuit performs rectification. Furthermore, the first switching circuit may be configured so as to perform rectification in synchronization with the second switching circuit.

In this case, the control section preferably controls the switching circuits such that the third switching circuit further performs power-factor improvement in the input mode. In the case of such a configuration, when the AC input voltage is subjected to voltage conversion, power factor is improved, consequently a ripple voltage is reduced.

In the switching power supply unit of an embodiment of the invention, the transformer may have a third transformer coil magnetically coupled to the first and second transformer coils, and a rectifier circuit may be further provided between the third transformer coil and the second DC power supply. In the case of such a configuration, a pulse voltage generated by the first switching circuit based on a DC input voltage, or a pulse voltage generated by the second switching circuit based on an AC input voltage is transformed by the transformer, and the transformed pulse voltage is inputted into a rectifier circuit via the third transformer coil. The transformed pulse voltage is rectified by the rectifier circuit, and thus a DC voltage is supplied to the second DC power supply in addition to the first DC power supply. That is, based on the DC input voltage from the first DC power supply, DC voltage conversion (DC/DC converter) operation to the second DC power supply is performed in addition to DC/AC conversion (DC/AC inverter) operation to the AC voltage input/output terminals. In addition, charge operation is performed to at least one of the first and second DC power supplies by the DC output voltage based on the AC input voltage from the AC voltage input/output terminals.

According to the switching power supply unit of an embodiment of the invention, a first switching circuit is provided between a first transformer coil and a first DC power supply, a second switching circuit is provided between a second transformer coil and AC voltage input/output terminals, a third switching circuit is provided between the second switching circuit and the AC voltage input/output terminals, and each of the first to third switching circuits is a bidirectional switching circuit. Therefore, a circuit for outputting an AC voltage can be made common to a circuit for inputting an AC voltage to charge a battery. Accordingly, input terminals of an AC voltage can be made common to output terminals of an AC voltage by the AC voltage input/output terminals.

Other and further objects, features and advantages of the invention will appear more fully from the following description.

DETAILED DESCRIPTION OF THE PREFERRED EMBODIMENTS

Hereinafter, the best mode for carrying out an embodiment of the invention (hereinafter, simply called embodiment) will be described in detail with reference to drawings.

Figure 1:
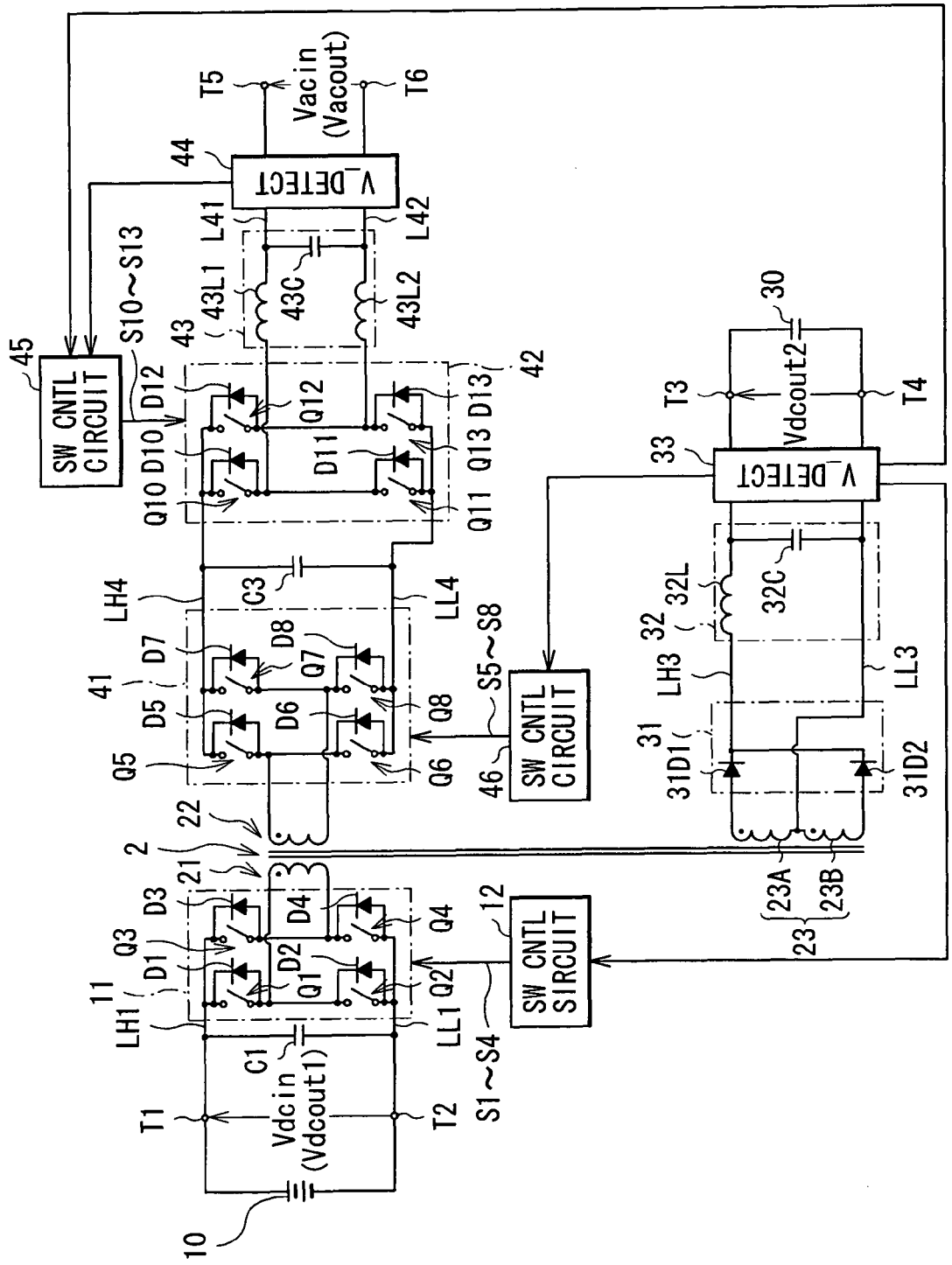
FIG. 1 is a circuit diagram showing a configuration of a switching power supply unit according to an embodiment of the invention.

FIG. 1 shows a circuit configuration of a switching power supply unit according to an embodiment of the invention. The switching power supply unit is applied to, for example, a car and the like, and has a transformer 2; a capacitor C1 and a bidirectional switching circuit 11 which are provided between the transformer 2 and a main battery 10 described later; bidirectional switching circuits 41 and 42, a capacitor C3, a smoothing circuit 43, and a voltage detection section 44, those being provided between the transformer 2 and AC voltage input/output terminals T5 and T6 described later; and a rectifier circuit 31, a smoothing circuit 32, and a voltage detection section 33, those being provided between the transformer 2 and an accessory battery 30; and SW (switching) control circuits 12, 45, and 46.

The capacitor C1 is disposed between a high voltage line LH1 and a low voltage line LL1, and acts as a smoothing capacitor. One end of the high voltage line LH1 is connected to an input/output terminal T1, one end of the low voltage line LL1 is connected to an input/output terminal T2, and a main battery 10 is disposed between the input/output terminals T1 and T2. The main battery 10 supplies a DC input voltage Vdcin between the input/output terminals T1 and T2, and for example, when the switching power supply unit is applied to a car, the unit is connected to a driving inverter or a step-up/step-down converter, and acts as a high voltage battery of, for example, about 350 to 500 V.

The switching circuit 11 is a switching circuit in a full-bridge type having four switching elements Q1 to Q4 and four diodes D1 to D4. Specifically, one end of the switching element Q1 is connected to the high voltage line LH1, and the other end thereof is connected to one end of the switching element Q2 and one end of a winding 21 of the transformer 2 described later. One end of the switching element Q3 is connected to the high voltage line LH1, and the other end thereof is connected to one end of the switching element Q4 and the other end of the winding 21 of the transformer 2. The other end of the switching element Q2 and the other end of the switching element Q4 are connected to the low voltage line LL1 respectively. The diodes D1 to D4 are connected in parallel in an opposite direction to one another between respective two ends of the switching elements Q1 to Q4 (a cathode of each diode is connected to a side of the high voltage line LH1, and an anode of each diode is connected to a side of the low voltage line LL1). That is, one switching element and one diode configure one bidirectional switch, and thereby the switching circuit 11 acts as a bidirectional switching circuit. Specifically, while described later in detail, the switching circuit 11 acts as a DC/AC inverter circuit performing DC/AC conversion (conversion from DC to AC) or as a rectifier circuit. Each of the switching elements Q1 to Q4 is configured of, for example, a bipolar transistor, IGBT (Insulated Gate Bipolar Transistor), or MOS-FET (Metal Oxide Semiconductor-Field Effect Transistor). When each of the switching elements Q1 to Q4 is configured of MOS-FET and therefore has a parasitic diode component, such a parasitic diode component may be used in place of each of the diodes D1 to D4.

The SW control circuit 12 generates switching control signals S1 to S4 based on a DC output voltage Vdcout2 at an accessory battery 30 side, the voltage Vdcout2 being detected by the voltage detection section 33 described later, and controls switching operation of each of the switching elements Q1 to Q4 in the switching circuit 11 using the generated signals. Specifically, while described later in detail, the switching circuit 11 is controlled by the SW control circuit 12 so as to perform the DC/AC conversion operation or the rectification operation as described before.

The transformer 2 has a winding 21 provided at the main battery 10 side, a winding 22 provided at a side of input/output terminals T5 and T6 described later, and windings 23 (including a pair of windings 23A and 23B) provided at the accessory battery 30 side, and respective windings 21 to 23 are magnetically coupled to one another so as to have the same polarity. The winding 21 is disposed between the other end of the switching element Q1 and one end of the switching element Q4. Both ends of the winding 22 are connected to the switching circuit 41 described later, and respective two ends of the windings 23A and 23B are connected to the rectifier circuit 31.

The switching circuit 41 is a switching circuit in a full-bridge type having four switching elements Q5 to Q8 and four diodes D5 to D8. Specifically, one end of the switching element Q5 is connected to a high voltage line LH4, and the other end thereof is connected to one end of the switching element Q8 and one end of the winding 22 of the transformer 2. One end of the switching element Q7 is connected to the high voltage line LH4, and the other end thereof is connected to one end of the switching element Q8 and the other end of the winding 22. The other end of the switching element Q6 and the other end of the switching element Q8 are connected to a low voltage line LL4 respectively. The diodes D5 to D8 are connected in parallel in an opposite direction to one another between respective two ends of the switching elements Q5 to Q8 (a cathode of each diode is connected to a side of the high voltage line LH4, and an anode of each diode is connected to a side of the low voltage line LL4). That is, one switching element and one diode configure one bidirectional switch, and thereby the switching circuit 41 also acts as a bidirectional switching circuit. Specifically, while described later in detail, the switching circuit 41 acts as a rectifier circuit or a DC/AC inverter circuit. Each of the switching elements Q5 to Q8 is also configured of, for example, a bipolar transistor, IGBT, or MOS-FET. When each of the switching elements Q5 to Q8 is configured of MOS-FET and therefore has a parasitic diode component, such a parasitic diode component may be used in place of each of the diodes D5 to D8.

The SW control circuit 46 generates switching control signals S5 to S8 based on a DC output voltage Vdcout2 at the accessory battery 30 side, the voltage Vdcout2 being detected by the voltage detection section 33 described later, and controls switching operation of each of the switching elements Q5 to Q8 in the switching circuit 41 using the generated signals. Specifically, while described later in detail, the switching circuit 41 is controlled by the SW control circuit 46 so as to perform the rectification operation or the DC/AC conversion operation as described before.

The capacitor C3 is disposed between the high voltage line LH4 and the low voltage line LL4 in a position between the switching circuit 41 and a switching circuit 42 described later, and acts as a smoothing capacitor.

The switching circuit 42 is a switching circuit in a full-bridge type having four switching elements Q10 to Q13 and four diodes D10 to D13. Specifically, one end of the switching element Q10 is connected to the high voltage line LH4, and the other end thereof is connected to one end of the switching element Q11 and one end of an inductor 43L1 in a smoothing circuit 43 described later. One end of the switching element Q12 is connected to the high voltage line LH4, and the other end thereof is connected to one end of the switching element Q13 and one end of an inductor 43L2 in the smoothing circuit 43 described later. The other end of the switching element Q11 and the other end of the switching element Q13 are connected to the low voltage line LL4 respectively. The diodes D10 to D13 are connected in parallel in an opposite direction to one another between respective two ends of the switching elements Q10 to Q13 (a cathode of each diode is connected to a side of the high voltage line LH4, and an anode of each diode is connected to a side of the low voltage line LL4). That is, one switching element and one diode configure one bidirectional switch, and thereby the switching circuit 42 also acts as a bidirectional switching circuit. Specifically, while described later in detail, the switching circuit 42 acts as a DC/AC inverter circuit or an AC/DC converter circuit performing AC/DC conversion (conversion from AC to DC). Each of the switching elements Q10 to Q13 is also configured of, for example, a bipolar transistor, IGBT, or MOS-FET. When each of the switching elements Q10 to Q13 is configured of MOS-FET and therefore has a parasitic diode component, such a parasitic diode component may be used in place of each of the diodes D10 to D13.

When the switching circuit 42 acts as the AC/DC converter circuit, the circuit 42 acts even as a PFC (Power Factor Correction) circuit performing operation of power factor correction. Specifically, while described later in detail, an input voltage into the switching circuit 42 as a PFC circuit can be stepped up and stabilized so as to improve power factor.

The SW control circuit 45 generates switching control signals S10 to S13 based on an AC output voltage Vacout between the input/output terminals T5 and T6, the voltage Vacout being detected by the voltage detection section 44 described later, and controls switching operation of each of the switching elements Q10 to Q13 in the switching circuit 42 using the generated signals. Specifically, while described later in detail, the switching circuit 42 is controlled by the SW control circuit 45 so as to perform the DC/AC conversion operation, AC/DC conversion operation, and PFC operation as described before.

The smoothing circuit 43 has the two inductors 43L1, 43L2 and a capacitor 43C. The inductor 43L1 is disposed on the connection line L41 in an insertional manner, and one end of the inductor 43L1 is connected to the other end of the switching element Q10 and one end of the switching element Q11, and the other end thereof is connected to the input/output terminal T5 via the voltage detection section 44. The inductor 43L2 is disposed on the connection line L42 in an insertional manner, and one end of the inductor 43L2 is connected to the other end of the switching element Q12 and one end of the switching element Q13, and the other end of the inductor 43L2 is connected to the input/output terminal T6 via the voltage detection section 44. The capacitor 43C is disposed between the connection line L41 (a portion near the other end of the inductor 43L1) and the connection line L42 (a portion near the other end of the inductor 43L2).

The voltage detection section 44 detects an AC voltage between the input/output terminal T5 and T6 (specifically, AC output voltage Vacout), and outputs a voltage corresponding to the detected AC output voltage Vacout to the SW control circuit 45. As a specific circuit configuration of the voltage detection section 44, for example, a circuit configuration is given, in which a voltage dividing resistance (not shown) disposed between the connection line L41 and 0V potential of the SW control circuit 45, and a voltage dividing resistance disposed between the connection line L42 and 0V potential of the SW control circuit 45 are used to detect the AC output voltage Vacout and generate the voltage corresponding to the voltage Vacout.

The rectifier circuit 31 has two diodes 31D1 and 31D2. An anode of the diode 31D1 is connected to one end of the winding 23A. An anode of the diode 31D2 is connected to one end of the winding 23B. Cathodes of the diodes 31D1 and 31D2 are commonly connected to a high voltage line LH3. The other ends of the windings 23A and 23B are commonly connected to each other, and connected to a low voltage line LL3. That is, the rectifier circuit 31 is in a cathode common type.

The smoothing circuit 32 has an inductor 32L and a capacitor 32C. The inductor 32L is disposed on the high voltage line LH3 in an insertional manner, and one end of the inductor is connected to the cathodes of the diodes 31D1 and 31D2, and the other end thereof is connected to the output terminal T3 via the voltage detection section 33. The capacitor 32C is disposed between the high voltage line LH3 (a portion near the other end of the inductor 32L) and the low voltage line LL3, and the other end of the low voltage line LL3 is connected to the output terminal T4. The accessory battery 30 for driving a not-shown accessory (for example, power window) is connected between the output terminals T3 and T4 to supply the DC output voltage Vdcout2 (for example, about 14 V) between the output terminals T3 and T4.

The voltage detection section 33 detects the DC output voltage Vdcout2 supplied between the output terminals T3 and T4, and outputs a voltage corresponding to the detected DC output voltage Vdcout2 to the SW control circuit 12. As a specific circuit configuration of the voltage detection section 33, for example, a circuit configuration is given, in which a voltage dividing resistance (not shown) disposed between the high voltage line LH3 and the low voltage line LL3 is used to detect the DC output voltage Vdcout2 and generate a voltage corresponding to the DC output voltage.

The winding 21 corresponds to a specific example of a "first transformer coil" in an embodiment of the invention, the winding 22 corresponds to a specific example of a "second transformer coil" in an embodiment of the invention, and the windings 23 (23A and 23B) correspond to a specific example of a "third transformer coil" in an embodiment of the invention. Moreover, the main battery 10 corresponds to a specific example of a "first DC power supply" in an embodiment of the invention, and the accessory battery 30 corresponds to a specific example of a "second DC power supply" in an embodiment of the invention. Moreover, the switching circuit 11 corresponds to a specific example of a "first switching circuit" in an embodiment of the invention, the switching circuit 41 corresponds to a specific example of a "second switching circuit" in an embodiment of the invention, and the switching circuit 42 corresponds to a specific example of a "third switching circuit" in an embodiment of the invention. The rectifier circuit 31 corresponds to a specific example of a "rectifier circuit" in an embodiment of the invention. The SW control circuits 12, 45 and 46 correspond to specific examples of "control sections" in an embodiment of the invention respectively. The input/output terminals T5 and T6 correspond to a specific example of "AC voltage output terminals" in an embodiment of the invention.

Next, operation of the switching power supply unit having a configuration as above is described in detail.

First, with reference to FIGS. 1 to 5A and 5B, detailed description is made on operation in the case that when the DC input voltage Vdcin is supplied from the main battery 10, the AC output voltage Vacout is outputted from the input/output terminals T5 and T6. For example, when the DC input voltage Vdcin is supplied from the main battery 10 in this way, in the case that the switching power supply unit of the embodiment is applied to a car, the operation corresponds to operation in the case that a power is supplied from a motor driving inverter or a step-up/step-down converter to the main battery 10, thereby the accessory battery 30 drives an accessory and outputs the AC output voltage Vacout to the outside, that is, the relevant operation corresponds to operation during engine operation (car running), or operation in the case that the AC output voltage Vacout is outputted based on only the DC input voltage Vdcin supplied from the main battery 10 during engine stopping. For example, the commercial power voltage may be supposed as the Vacout.

Figure 2:
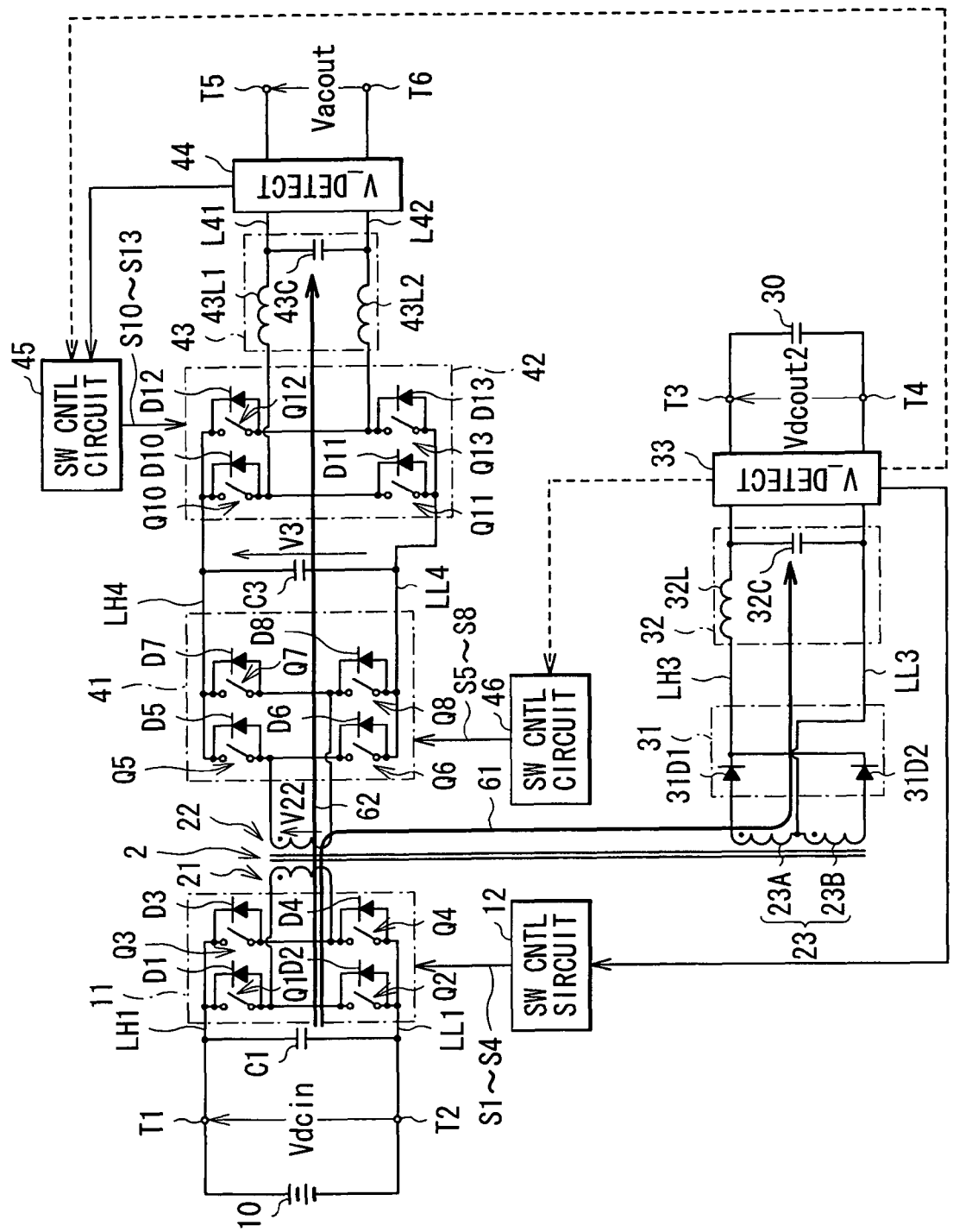
FIG. 2 is a circuit diagram for illustrating an example of energy transfer paths in the switching power supply unit.

FIG. 2 schematically shows an example of energy transfer paths when the DC input voltage Vdcin is supplied from the main battery 10 using arrows 61 and 62. The energy transfer path 61 in the energy transfer paths 61 and 62 corresponds to the operation of generation and output of the DC output voltage Vdcout2 (operation as the DC/DC converter).

First, operation of generation and output of the DC output voltage Vdcout2 at the accessory battery 30 side is described in detail with reference to FIGS. 1 and 2.

When a DC input voltage Vdcin is inputted from the main battery 10 via the input/output terminals T1 and T2, the switching circuit 11 acts as a DC/AC inverter circuit, and switches the DC input voltage Vdcin, so that an AC pulse voltage is generated and supplied to the winding 21 of the transformer 2. Thus, a transformed (here, stepped-down) AC pulse voltage is generated at the windings 23A and 23B of the transformer 2. In this case, a transformation level is determined by a winding ratio of the winding 21 to the windings 23A and 23B.

Next, the transformed AC pulse voltage is rectified by the diodes 31D1 and 31D2 in the rectifier circuit 31. Thus, rectified output is produced between the high voltage line LH3 and the low voltage line LL3.

Next, the smoothing circuit 32 smoothes the rectified output produced between the high voltage line LH3 and the low voltage line LL3, and the DC output voltage Vdcout2 is thus outputted from the output terminals T3 and T4. The DC output voltage Vdcout2 is supplied to the accessory battery 30, and used to drive a not-shown accessory. The DC output voltage Vdcout2 is detected by the voltage detection section 33, and switching control signals Si to S4 are outputted form the SW control circuit 12 to the switching circuit 11 based on the detected DC output voltage Vdcout2, thereby the switching circuit 11 performs DC/AC conversion operation, and the switching elements Q1 to Q4 in the switching circuit 11 are subjected to PWM (Pulse Width Modulation) control such that the DC output voltage Vdcout is constant.

In this way, the DC input voltage Vdcin supplied from the main battery 10 is subjected to DC voltage conversion into the DC output voltage Vdcout2 by the switching circuit 11, windings 21, 23A and 23B of the transformer 2, rectifier circuit 31, and smoothing circuit 32, those collectively acting as the DC/DC converter, and then the DC output voltage is outputted from the output terminals T3 and T4. Thus, the accessory battery 30 is subjected to constant-voltage charge, and a not-shown accessory is driven.

Next, operation of generation and output of the AC output voltage Vacout is described in detail with reference to FIGS. 1 to 5A and 5B. The energy transfer path 62 shown in FIG. 2 corresponds to the operation of generation and output of the AC output voltage Vacout (operation as the DC/AC inverter).

Figure 7:
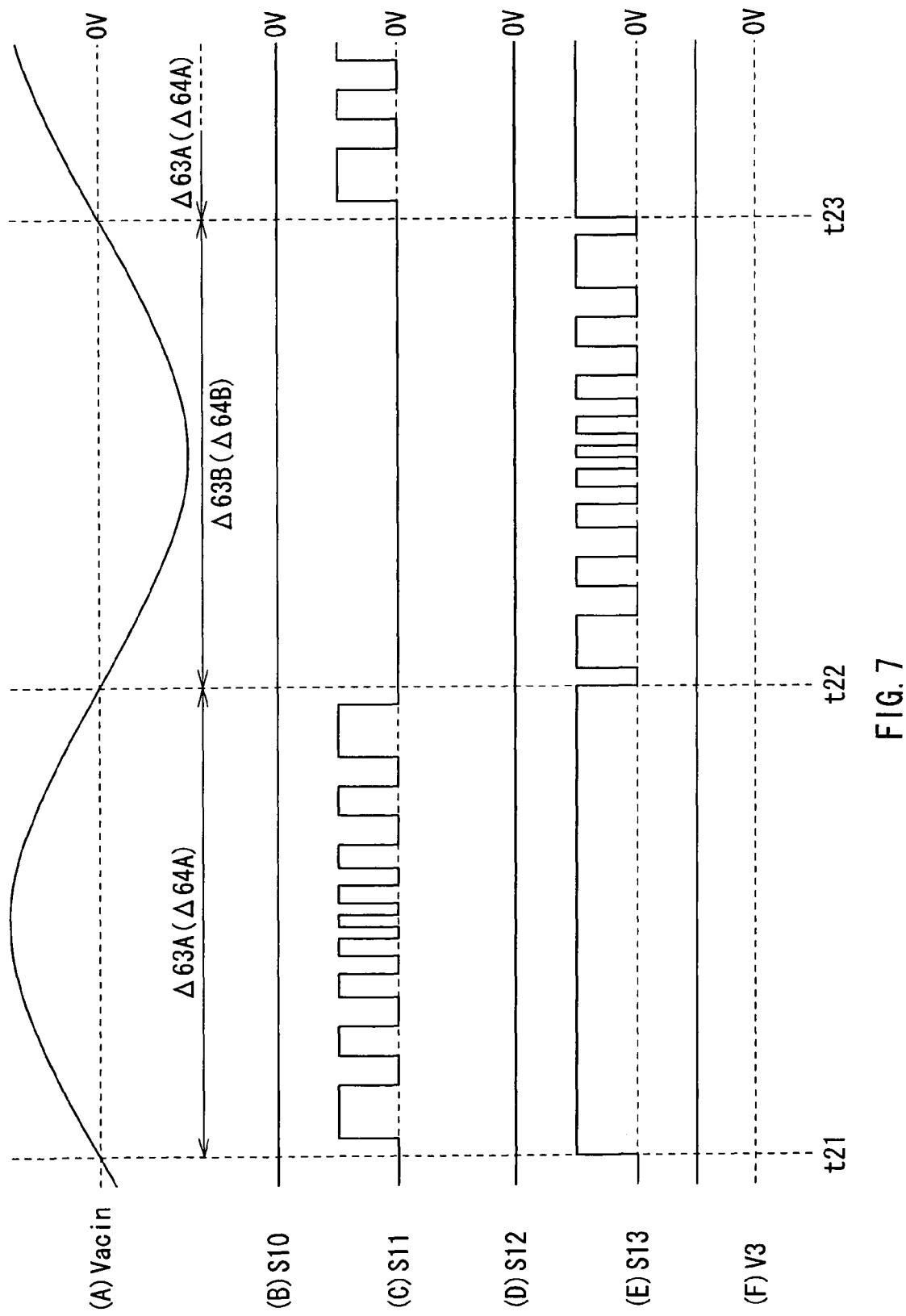
FIGS. 7A to 7F are timing waveform diagrams for illustrating conversion operation of an AC input voltage.

FIGS. 3A to 3F show, by timing waveform diagrams, an example of operation of performing voltage conversion and rectification of the DC input voltage Vdcin; wherein FIG. 3A shows switching control signals S1 and S4, FIG. 3B shows switching control signals S2 and S3, FIG. 3C shows a voltage V22 generated between both ends of the winding 22 of the transformer 2, FIG. 3D shows switching control signals S5 and S8, FIG. 3E shows switching control signals S6 and S7, and FIG. 7F shows a voltage V3 between both ends of the capacitor C3. FIGS. 4A to 4F show, by timing waveform diagrams, an example of operation of generation and output of the AC output voltage Vacout based on the voltage V3; wherein FIG. 4A shows a voltage V3 between both ends of the capacitor C3, FIGS. 4B to 4E show switching control signals S10 to S13 respectively, and FIG. 4F shows the AC output voltage Vacout. Each of directions of arrows shown in FIG. 2 shows each of positive directions of the voltages V22, V3 and Vacout.

Figure 3:
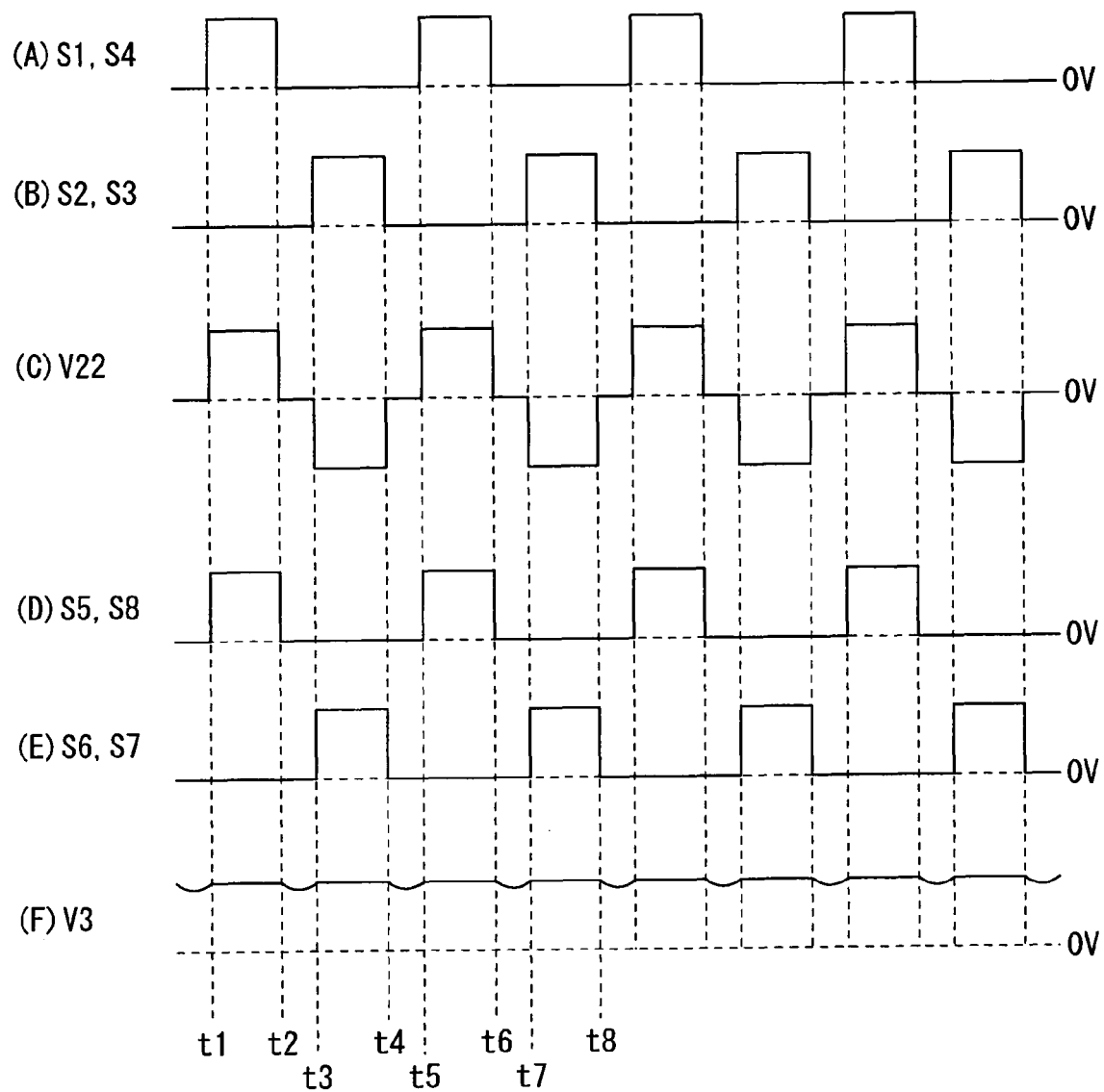
FIGS. 3A to 3F are timing waveform diagrams for illustrating an example of conversion operation of a DC input voltage.
Figure 4:
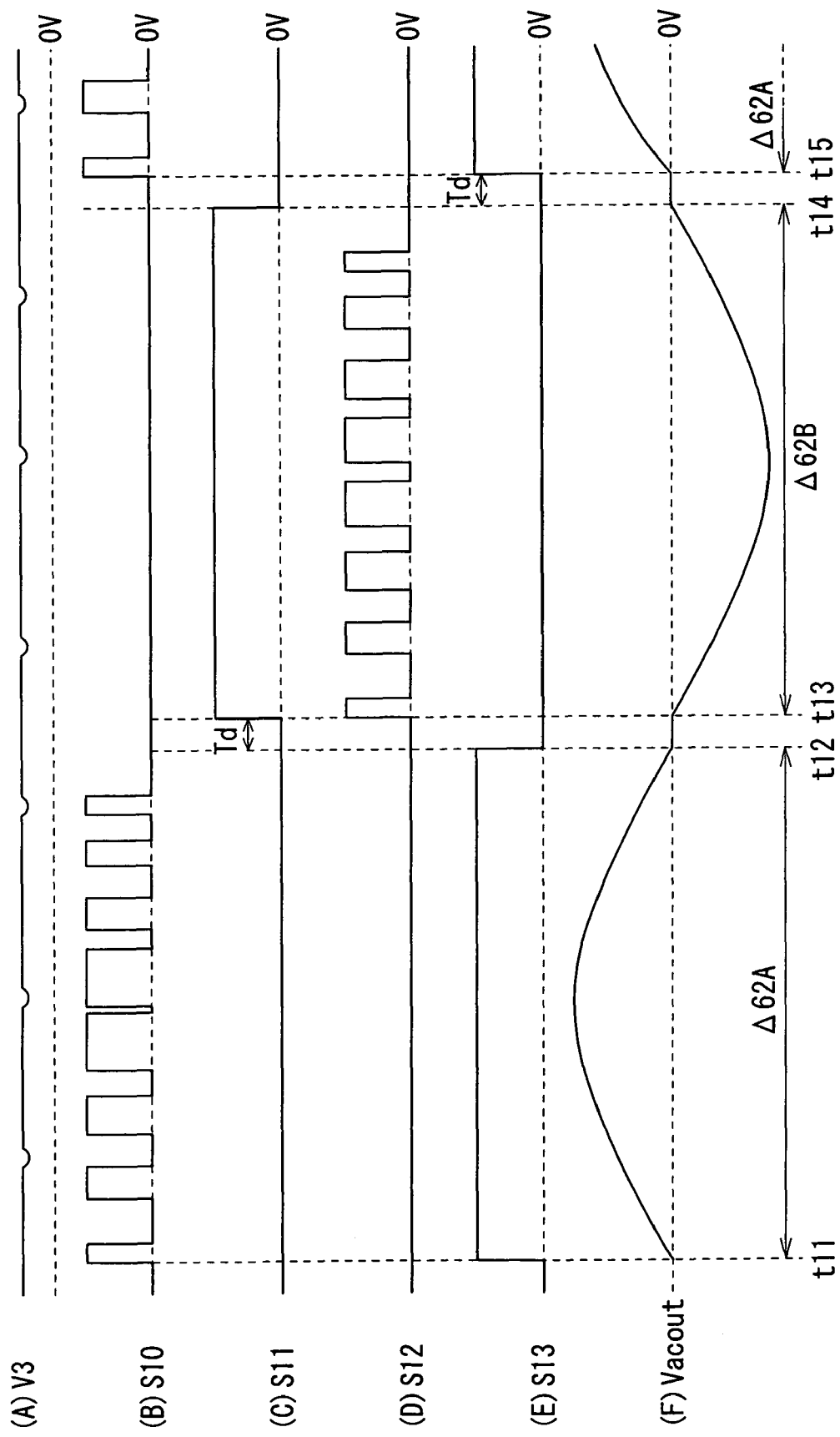
FIGS. 4A to 4F are timing waveform diagrams for illustrating an example of generation operation of an AC output voltage.

First, when the DC input voltage Vdcin is inputted from the main battery 10 via the input/output terminals T1 and T2, as shown in a period of timing t1 to timing t8 in FIG. 3, an AC pulse voltage is generated by the switching circuit 11 based on the switching control signals S1 to S4 (FIGS. 3A and 3B), and the AC pulse voltage is supplied to the winding 21 of the transformer 2. At that time, a transformed AC pulse voltage 22 is generated at the windings 23A and 23B of the transformer 2, in addition, generated at the winding 22 thereof (FIG. 3C) Even in this case, a transformation level is determined by the winding ratio of the winding 21 to the winding 22.

Next, the transformed AC pulse voltage is rectified by the diodes D5 to D8 in the switching circuit 41 acting as the rectifier circuit. Thus, for example, rectified output (voltage V3) as shown in FIG. 3F and FIG. 4A is produced between the high voltage line LH4 and the low voltage line LL4 (between both ends of the capacitor C3). The respective switching elements Q5 to Q8 perform PWM operation according to the switching control signals S5 to S8 (FIGS. 3D and 3E), and the switching circuit 41 performs synchronous rectification operation in order to reduce switching loss in the respective switching elements Q5 to Q8.

Next, the switching circuit 42 acts as a DC/AC inverter, and the switching elements Q10 to Q13 switch the voltage V3 according to the switching control signals S10 to S13 (see FIGS. 4B to 4E) from the SW control circuit 45.

Figure 5A:
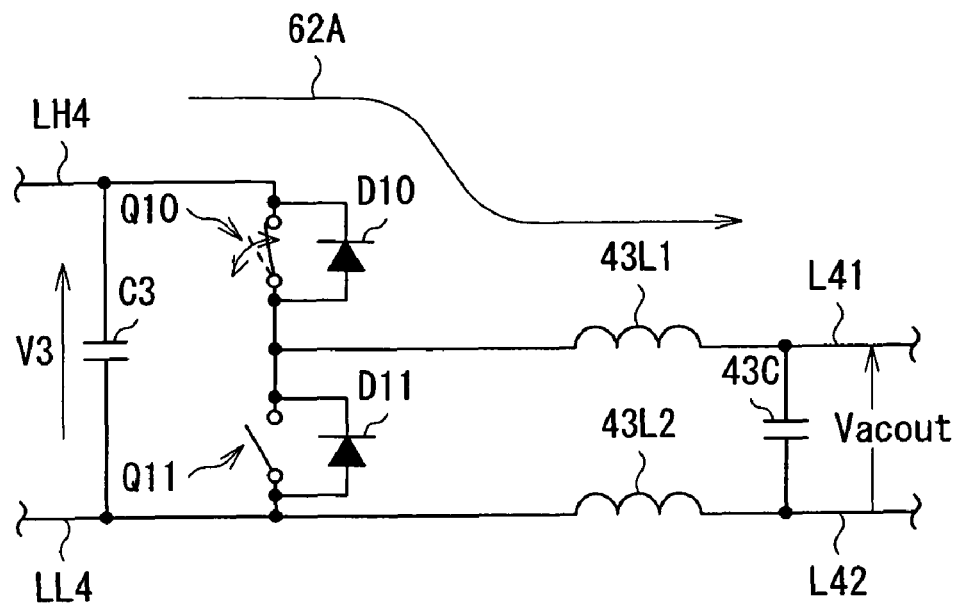
FIGS. 5A and 5B are equivalent circuit diagrams for illustrating operation of a switching circuit in generation operation of the AC output voltage as shown in FIG. 4.

Specifically, for example, first, in a period of timing t11 to timing t12 (positive half-wave period Δ62A), the switching control signal S13 normally shows "H" (FIG. 4E) and thus the switching element Q13 is in a normally on state, and the switching control signal S12 normally shows "L" (FIG. 4D) and thus the switching element Q12 is in a normally off state. Thus, an equivalent circuit of a section including the switching circuit 42 and the smoothing circuit 43 is given as shown in FIG. 5A. In this period, as shown in FIG. 4B, the switching control signal S10 is gradually increased in pulse width in the first half of the period of timing t11 to timing t12, and gradually decreased in pulse width in the second half of the period of timing t11 to timing t12. Moreover, the switching control signal S11 normally shows "L" as shown in FIG. 4C. That is, in the period, the switching element Q11 is in a normally off state and thus the diode D11 becomes conductive, and the switching element Q10 is in an on/off state according to PWM control. Therefore, in the positive half-wave period Δ62A, along the energy path 62A shown in FIG. 5A, the AC output voltage Vacout outputted from the input/output terminals T5 and T6 has a sine waveform being convex upward as shown in FIG. 4F due to the switching operation by the switching elements Q10 to Q13 and smoothing processing by the smoothing circuit 43. In the positive half-wave period Δ62A, the switching element Q11 may be in the normally on state to achieve synchronous rectification operation. In such a case, switching loss in the switching element Q11 is preferably reduced.

A subsequent period of timing t12 to timing t13 corresponds to dead time Td in which all of the switching elements Q10 to Q13 are in the off state (FIGS. 4B to 4E).

Figure 5B:
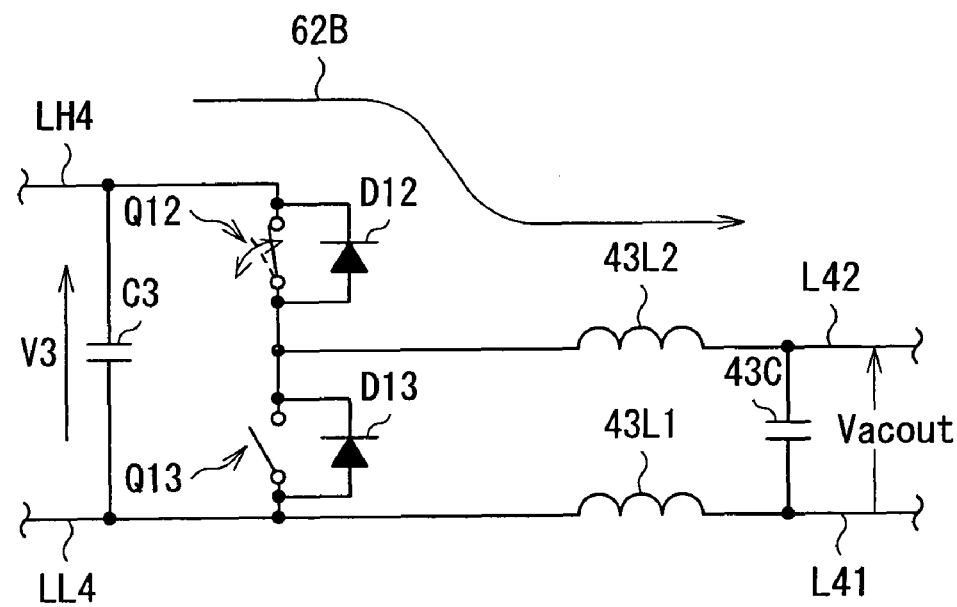

Next, in a period of timing t13 to timing t14 (negative half-wave period Δ62B), the switching control signal S11 normally shows "H" (FIG. 4C) and thus the switching element Q11 is in a normally on state, and the switching control signal S10 normally shows "L" (FIG. 4B) and thus the switching element Q10 is in a normally off state. Thus, as shown in FIG. 5B, an equivalent circuit of a section including the switching circuit 42 and the smoothing circuit 43 is in a configuration vertically opposite to that in a portion of the smoothing circuit 43 as shown in FIG. 5A. In this period, as shown in FIG. 4D, the switching control signal S12 is gradually increased in pulse width in the first half of the period of timing t13 to timing t14, and gradually decreased in pulse width in the second half of the period of timing t13 to timing t14. Moreover, the switching control signal S13 normally shows "L" as shown in FIG. 4E. That is, in the period, the switching element Q13 is in a normally off state and thus the diode D13 becomes conductive, and the switching element Q12 is in an on/off state according to PWM control. Therefore, in the negative half-wave period Δ62B, along the energy path 62B shown in FIG. 5B, the AC output voltage Vacout outputted from the input/output terminals T5 and T6 has a sine waveform being convex downward as shown in FIG. 4F due to the switching operation by the switching elements Q10 to Q13 and smoothing processing by the smoothing circuit 43. Even in the negative half-wave period Δ62B, the switching element Q13 may be in the normally on state to achieve synchronous rectification operation. In such a case, switching loss in the switching element Q13 is preferably reduced.

A subsequent period of timing t14 to timing t15 also corresponds to the dead time Td in which all of the switching elements Q10 to Q13 are in the off state (FIGS. 4B to 4E). An operation condition at timing t15 is equivalent to an operation condition at timing t11. After the timing t15, operation in the period of timing t11 to timing t15 is repeated. The AC output voltage Vacout outputted from the output terminals T5 and T6 is detected by the voltage detection section 44, and the switching control signals S10 to S13 are outputted from the SW control circuit 45 to the switching circuit 42 based on the detected AC output voltage Vacout, thereby the switching elements Q10 to Q13 in the switching circuit 42 are controlled in pulse width such that the switching circuit 42 performs DC/AC conversion operation, and the AC output voltage Vacout is stabilized. When the AC output voltage Vacout is supplied between the output terminals T5 and T6, the voltage Vacout acts as a power voltage of electric devices, that is, acts as a so-called commercial power voltage.

In this way, when the DC input voltage Vdcin is supplied from the main battery 10 as shown in FIG. 2, based on the DC input voltage Vdcin inputted from the main battery 10, the DC output voltage Vdcout2 is generated by the DC/DC converter including the switching circuit 11, SW control circuit 12, windings 21, 23A and 23B of the transformer 2, rectifier circuit 31, and smoothing circuit 33, and is outputted from the output terminals T3 and T4, and the AC output voltage Vacout is generated by the DC/AC inverter including the switching circuit 11, windings 21 and 22 of the transformer 2, switching circuit 41, switching circuit 42, SW control circuits 45 and 46, and smoothing circuit 43, and is outputted from the output terminals T5 and T6.

Next, with reference to FIG. 1 and FIGS. 6 to 9A to 9F, detailed description is made on operation in the case that the AC input voltage Vacin is inputted from the input/output terminals T5 and T6 (operation in the case that DC output voltages Vdcout1 and Vdcout2 are generated based on the AC input voltage Vacin and outputted to the main battery 10 and the accessory battery 30 to charge the batteries respectively). In operation in this case, for example, in the case that the switching power supply unit of the embodiment is applied to a car, when an engine is stopped, the AC input voltage Vacin is inputted from an external commercial power supply 50 in order to charge at least one of the main battery 10 and the accessory battery 30.

Figure 6:
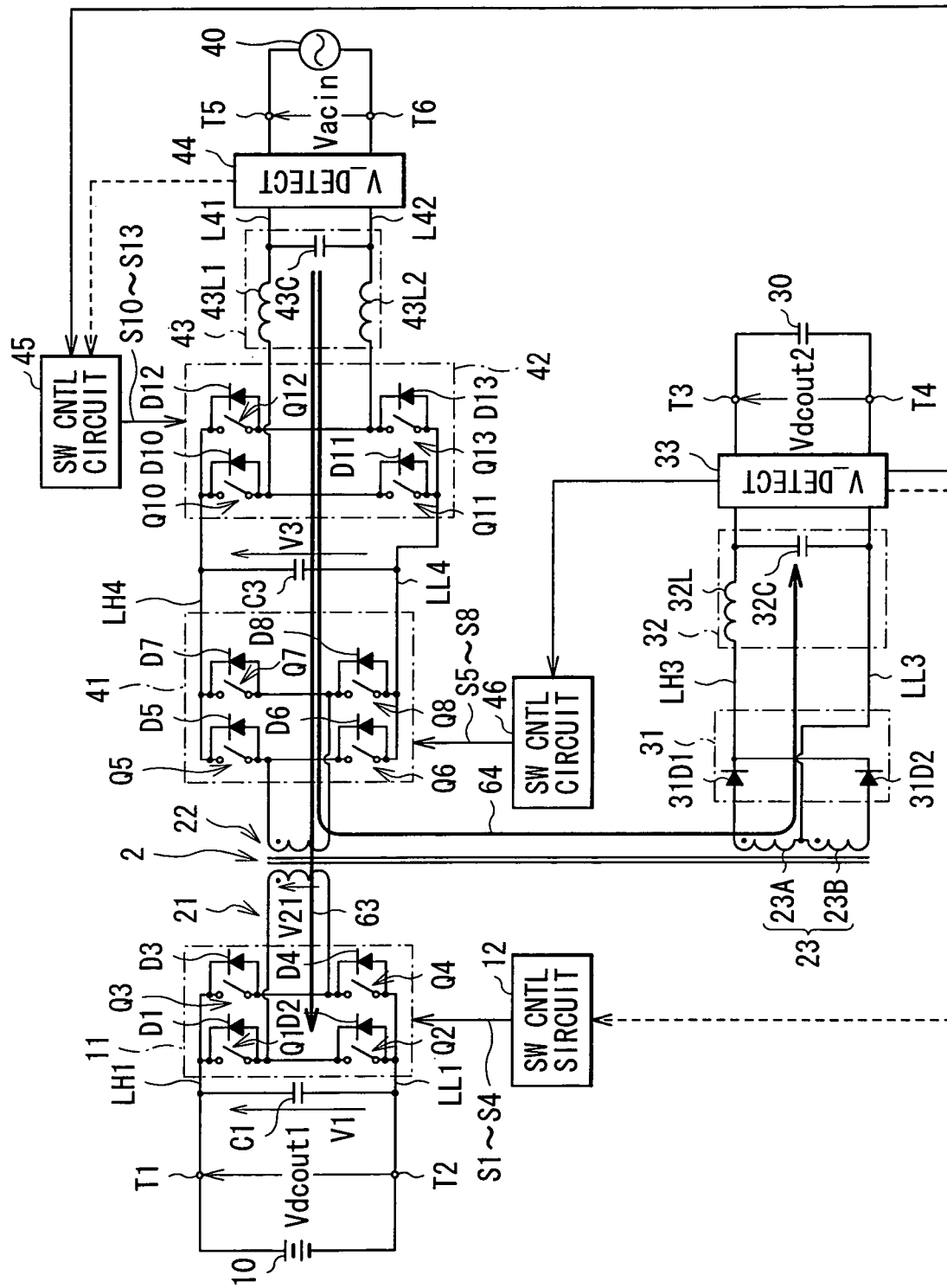
FIG. 6 is a circuit diagram for illustrating another example of energy transfer paths in the switching power supply unit.

FIG. 6 schematically shows an example of energy transfer paths by arrows 63 and 64 in the case that the AC input voltage Vacin is inputted from the commercial power supply 50, and FIGS. 7A to 7F and FIGS. 9A to 9F show operation waveforms in such a case by timing waveform diagrams respectively. Specifically, FIGS. 7A to 7F show operation waveforms before the voltage V3 between both ends of the capacitor C3 is generated based on the AC input voltage Vacin; wherein FIG. 7A shows the AC input voltage Vacin, FIGS. 7B to 7E show switching control signals S10 to S13 respectively, and FIG. 7F shows the voltage V3 between both ends of the capacitor C3, respectively. FIGS. 9A to 9F show operation waveforms before the capacitor C1 is charged (the main battery 10 is charged) based on the voltage V3; wherein FIG. 9A shows switching control signals S5 and S8, FIG. 9B shows switching control signals S6 and S7, FIG. 9C shows a voltage V21 generated between both ends of the winding 21 of the transformer 2, FIG. 9D shows switching control signals S1 and S4, FIG. 9E shows switching control signals S2 and S3, and FIG. 9F shows the voltage V1 between both ends of the capacitor C1, respectively. Directions of arrows shown in FIG. 6 show positive directions of the AC input voltage Vacin, and the voltages V3, V21 and V1 respectively.

When an AC input voltage Vacin (commercial power voltage) as shown in FIG. 7A is inputted from the commercial power supply 50 via the input/output terminals T5 and T6, the AC input voltage is subjected to smoothing processing for removing noise components by the smoothing circuit 43, and then inputted into the switching circuit 42. Then, the switching circuit 42 acts as a step-up AC/DC converter using inductor components of the inductors 43L1 and 43L2, and the switching elements Q10 to Q13 switch the AC input voltage Vacin according to the switching control signals S10 to S13 (FIGS. 7B to 7E) from the SW control circuit 45 respectively. The SW control circuit 45 is controlled based on an output voltage from the switching circuit 42.

Figure 8A:
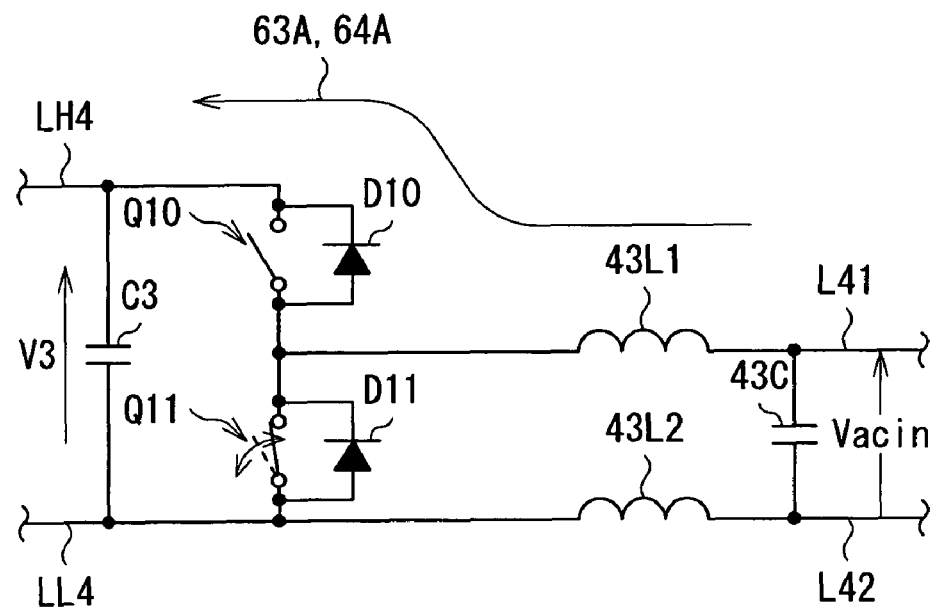
FIGS. 8A and 8B are equivalent circuit diagrams for illustrating operation of a switching circuit in conversion operation of the AC input voltage as shown in FIG. 7.

Specifically, for example, first, in a period of timing t21 to timing t22 (positive half-wave period Δ63A (Δ64A) in which the AC input voltage Vacin has a sine waveform being convex upward), the switching control signal S13 normally shows "H" (FIG. 7E) and thus the switching element Q13 is in a normally on state, and the switching control signal S12 normally shows "L" (FIG. 7D) and thus the switching element Q12 is in a normally off state. Thus, an equivalent circuit of a section including the switching circuit 42 and the smoothing circuit 43 is given as shown in FIG. 8A. In this period, as shown in FIG. 7C, the switching control signal S11 is gradually decreased in pulse width in the first half of the period of timing t21 to timing t22, and gradually increased in pulse width in the second half of the period of timing t21 to timing t22. Moreover, the switching control signal S10 normally shows "L" as shown in FIG. 7B. That is, in the period, the switching element Q10 is in a normally off state and thus the diode D12 becomes conductive, and the switching element Q11 is in an on/off state according to PWM control. Therefore, in the positive half-wave period Δ63A (Δ64A), along the energy paths 63A and 64A shown in FIG. 8A, the voltage V3 between both ends of the capacitor C3 becomes a DC voltage having a constant value as shown in FIG. 7F due to smoothing processing by the smoothing circuit 43 and the switching operation by the switching elements Q10 to Q13. In the positive half-wave period Δ63A (Δ64A), the switching element Q10 may be in an opposite-phase state with respect to the switching element Q11 to achieve synchronous rectification operation. In such a case, switching loss and conduction loss in the diode D10 are preferably reduced.

Figure 8B:
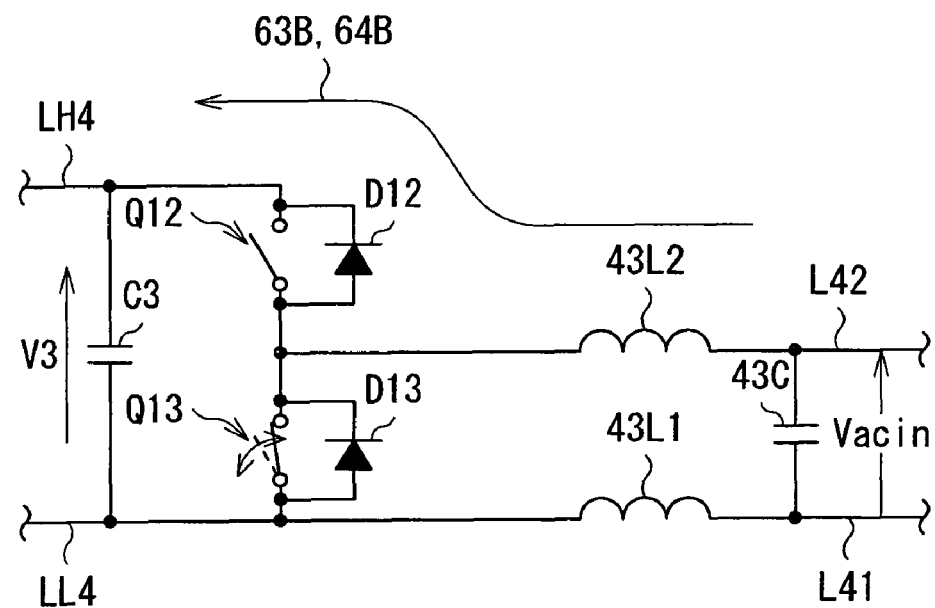

Next, in a period of timing t22 to timing t23 (negative half-wave period Δ63B (Δ64B) in which the AC input voltage Vacin has a sine waveform being convex downward), the switching control signal S11 normally shows "H" (FIG. 7C) and thus the switching element Q11 is in a normally on state, and the switching control signal S10 normally shows "L" (FIG. 7B) and thus the switching element Q10 is in a normally off state. Thus, as shown in FIG. 8B, an equivalent circuit of a section including the switching circuit 42 and the smoothing circuit 43 is in a configuration vertically opposite to that shown in FIG. 8A in the portion of the smoothing circuit 43. In this period, the switching control signal S11 is gradually decreased in pulse width in the first half of the period of timing t22 to timing t23, and gradually increased in pulse width in the second half of the period of timing t22 to timing t23 as shown in FIG. 7E. Moreover, the switching control signal S12 normally shows "L" as shown in FIG. 7D. That is, in the period, the switching element Q12 is in a normally off state and thus the diode D12 becomes conductive, and the switching element Q13 is in an on/off state according to PWM control. Therefore, in the negative half-wave period Δ63B (Δ64B), along the energy paths 63B and 64B shown in FIG. 8B, the voltage V3 between both ends of the capacitor C3 becomes a DC voltage having a constant value as shown in FIG. 7F due to smoothing processing by the smoothing circuit 43 and the switching operation by the switching elements Q10 to Q13. Even in the negative half-wave period Δ63B (Δ64B), the switching element Q12 may be in an opposite-phase state with respect to the switching element Q13 to achieve synchronous rectification operation. In such a case, switching loss and conduction loss in the diode D12 are preferably reduced.

In the switching circuit 42 and the smoothing circuit 43, power factor is improved compared with a rectifier in a capacitor input type for performing the AC/DC conversion operation. Thus, a peak current is reduced, and thereby a ripple voltage is reduced compared with a smoothing capacitor having the same capacity.

Next, the main battery 10 and the accessory battery 30 are charged through the energy transfer paths 63 and 64 based on the voltage V3 stored between both ends of the capacitor C3.

First, along the energy transfer path 63, the switching circuit 41 acts as the DC/AC inverter circuit, and the switching elements Q5 to Q8 perform on/off operation as shown in a period of timing t31 to timing t38 in FIGS. 9A and 9B and the like, thereby an AC pulse voltage is generated at the winding 22 of the transformer 2. Then, a transformed AC pulse voltage 21 as shown in FIG. 9C is generated between both ends of the winding 21 depending on a winding ratio of the winding 22 to the winding 21. Next, the switching circuit 11 acts as a rectifier circuit in this case, and the switching elements Q1 to Q4 perform on/off operation as shown in FIGS. 9D and 9E, thereby the AC pulse voltage 21 is rectified, and a constant DC voltage V1 as shown in FIG. 9F is applied between both ends of the capacitor C1. In this way, the main battery 10 is charged by the DC output voltage Vdcout1 based on the voltage V1. The switching elements Q1 to Q4 perform PWM operation according to the switching control signals S1 to S4 respectively, the PWM operation being synchronized with PWM operation of the switching circuit 41.

On the other hand, along the energy transfer path 64, when the AC pulse voltage is generated at the winding 22 of the transformer 2 as above, a transformed AC pulse voltage is generated even at the windings 23A and 23B of the transformer 2, a transformation level of the transformed voltage being determined by a winding ratio of the winding 22 to the windings 23A and 23B. Therefore, the transformed AC pulse voltage is rectified by the rectifier circuit 31, and then smoothed by the smoothing circuit 32, thereby the accessory battery 30 is also charged by a constant voltage (DC output voltage Vdcout2). The DC output voltage Vdcout2 is detected by the voltage detection section 33, and the switching control signals S10 to S13 are outputted from the SW control circuit 45 to the switching circuit 42 based on the detected DC output voltage Vdcout2, thereby the switching circuit 42 performs AC/DC conversion operation, and the switching elements Q10 to Q13 in the switching circuit 42 are subjected to PWM control such that the voltage V3 between both ends of the capacitor C3 is constant. Similarly, the switching control signals S5 to S8 are outputted from the SW control circuit 46 to the switching circuit 41 based on the detected DC output voltage Vdcout2, thereby the switching circuit 41 performs DC/AC conversion operation, and the switching elements Q5 to Q8 in the switching circuit 41 are subjected to PWM control such that each of the DC output voltages Vdcout1 and Vdcout2 is constant.

In this way, when the AC input voltage Vacin (commercial power voltage) is supplied from the commercial power supply 50 as shown in FIG. 6, based on the inputted AC input voltage Vacin, the DC output voltage Vdcout1 is generated by the smoothing circuit 43, switching circuit 42, SW control circuit 45, switching circuit 41, SW control circuit 46, windings 22 and 21 of the transformer 2, switching circuit 11, and SW control circuit 12, and is outputted from the input/output terminals T1 and T2, and the DC output voltage Vdcout2 is generated by the smoothing circuit 43, switching circuit 42, SW control circuit 45, switching circuit 41, SW control circuit 46, windings 22, 23A and 23B of the transformer 2, rectifier circuit 31, and smoothing circuit 32, and is outputted from the output terminals T3 and T4. Thus, at least one of the main battery 10 and the accessory battery 30 is charged.

As hereinbefore, in the embodiment, the switching circuit 11 is provided between the winding 21 of the transformer 2 and the main battery 10, the switching circuit 41 is provided between the winding 22 of the transformer 2 and the input/output terminals T5 and T6, and the switching circuit 42 is provided between the switching circuit 41 and the input/output terminals T5 and T6, and each of the switching circuits 11, 41 and 42 includes a bidirectional switch (configured of a pair of one switching element and one diode connected in parallel to each other). Therefore, a circuit for outputting the AC output voltage Vacout can be made common to a circuit for inputting the AC input voltage Vacin into the main battery 10 to charge the battery 10. Accordingly, input terminals of an AC voltage can be made common to output terminals of an AC voltage by the input/output terminals T5 and T6.

Moreover, the transformer 2 has the windings 23A and 23B being magnetically coupled to the windings 21 and 22, and the rectifier circuit 31 is further provided between the windings 23A, 23B and the accessory battery 30. Therefore, based on the DC input voltage Vdcin from the main battery 10, DC voltage conversion (DC/DC converter) operation to the accessory battery 30 can be performed in addition to DC/AC conversion (DC/AC inverter) operation to the input/output terminals T5 and T6. In addition, charging operation can be performed to at least one of the main battery 10 and the accessory battery 30 by the DC output voltages Vdcout1 and Vdcout2 based on the AC input voltage Vacin from the input/output terminals T5 and T6.

While the invention has been described with the embodiment hereinbefore, the invention is not limited to the embodiment, and can be variously altered or modified.

For example, while description was made in the embodiment on the case that each of the switching circuits 11, 41 and 42 is in the full-bridge type, a configuration of the switching circuit is not limited to this, and for example, the switching circuits 11 and 42 may be configured of a switching circuit in a half-bridge type respectively.

Figure 10:
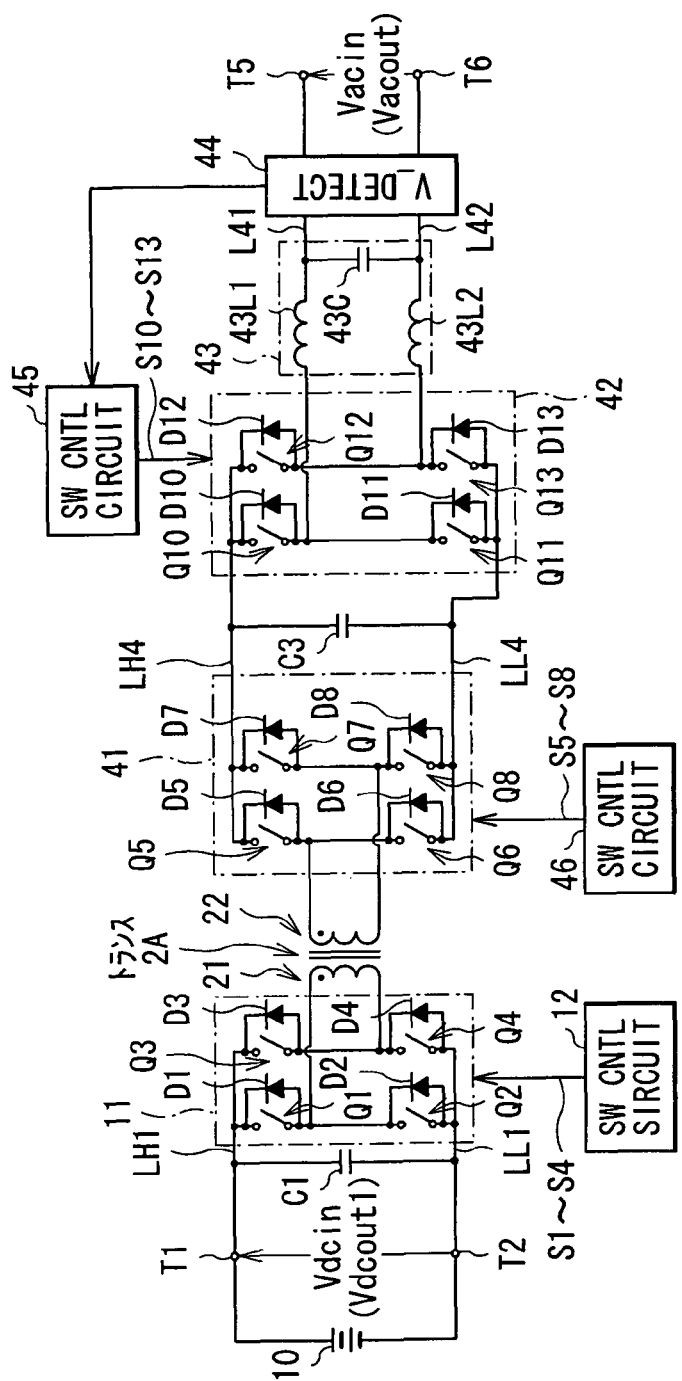
FIG. 10 is a circuit diagram showing a configuration of a switching power supply unit according to a modification of the invention.

Moreover, description was made in the embodiment on a case that the transformer 2 had the windings 21, 22 and 23 magnetically coupled to one another, and the rectifier circuit 31, smoothing circuit 32, and voltage detection section 33 were provided at the winding 23 side, thereby operation of generation and output of the DC output voltage Vdcout2 (operation as the DC/DC converter) based on the DC input voltage Vdcin was performed in addition to output operation of the AC output voltage Vacout (operation as the DC/AC inverter) and input operation of the AC input voltage Vacin (operation as the AC/DC converter). However, for example, when the accessory battery 30 is unnecessary and therefore operation as the DC/DC converter is also unnecessary, for example, as the switching power supply unit shown in FIG. 10, a transformer 2A having only the windings 21 and 22 magnetically coupled to each other may be provided in place of the transformer 2, and the rectifier circuit 31, smoothing circuit 32, and voltage detection section 33 at a winding 23 side may not be provided.

Figure 9:
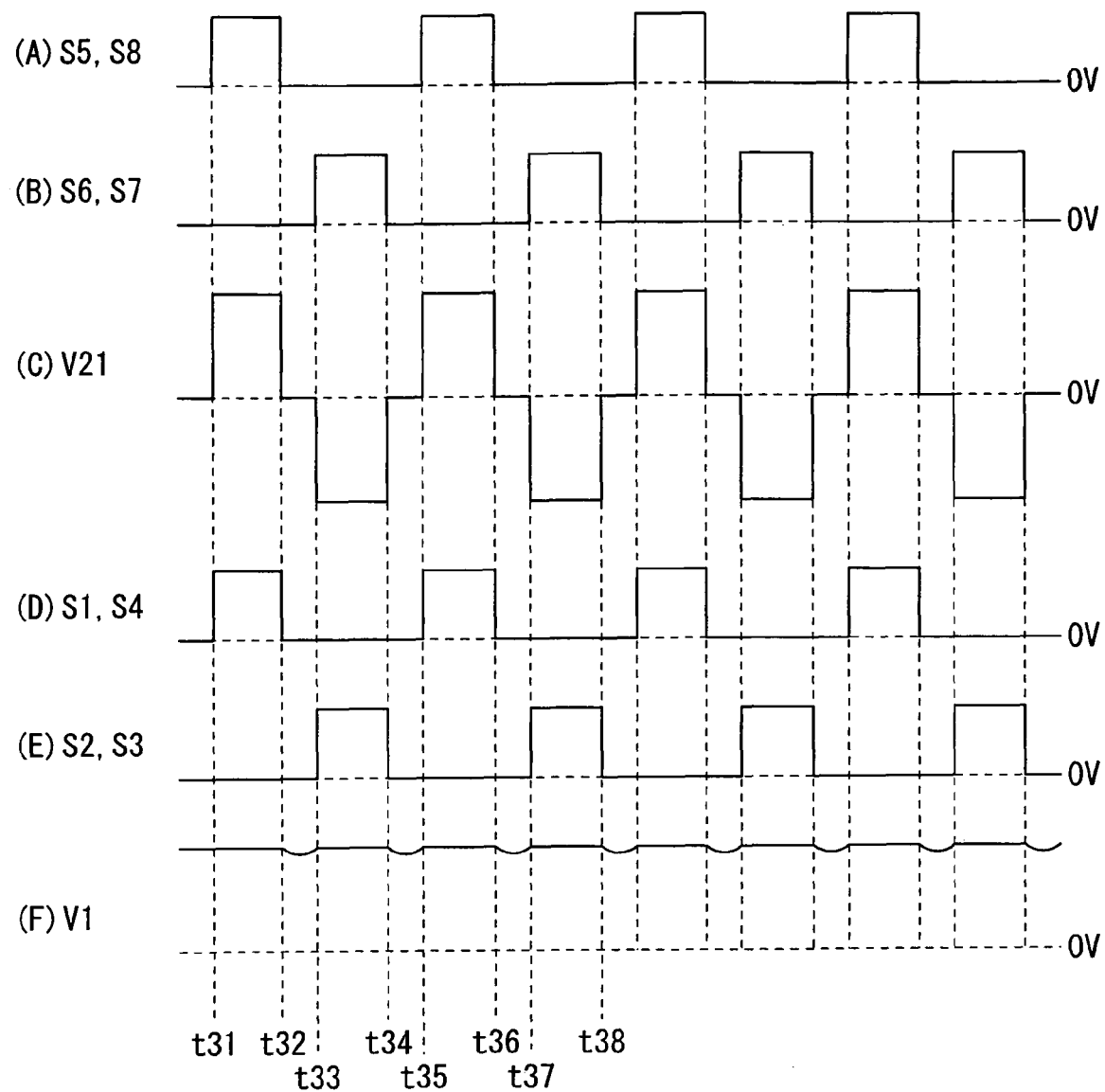
FIGS. 9A to 9F are timing waveform diagrams for illustrating an example of generation operation of a DC output voltage.

Furthermore, description was made in the embodiment on a case that the switching circuit 41 performed PWM operation and the switching circuit 11 performed rectification in synchronization with the switching circuit 41, for example, as shown in FIG. 3 or FIG. 9. However, for example, when the DC output voltage Vdcout1 is generated based on the AC input voltage Vacin, and is outputted into the main battery 10 to charge the battery 10, while the switching elements Q5 to Q8 in the switching circuit 41 perform switching operation with a variable pulse width respectively, the switching elements Q1 to Q4 in the switching circuit 11 perform switching operation with a fixed pulse width respectively, so that a charge level of the main battery 10 can be adjusted.

Obviously, many modifications and variations of the present invention are possible in the light of the above teachings. It is therefore to be understood that within the scope of the appended claims the invention may be practiced otherwise than as specifically described.

What is claimed is:

1. A switching power supply unit, comprising:
a transformer including a first transformer coil, a second transformer coil, and a third transformer coil magnetically coupled to each other,
a first bidirectional switching circuit disposed between the first transformer coil and a first DC power supply, and configured to include at least one switch array configured of a pair of switches connected in series,
a second bidirectional switching circuit disposed between the second transformer coil and AC voltage input/output terminals, and configured such that switch arrays are connected in parallel to each other, each of the switch arrays being configured of a pair of switches connected in series, a third bidirectional switching circuit disposed between the second switching circuit and the AC voltage input/output terminals, and configured to include at least one switch array configured of a pair of switches connected in series, a rectifier circuit disposed between the third transformer coil and a second DC power supply, a voltage detection circuit detecting a DC power supply outputted from the rectifier circuit to the second DC power supply, and a control section controlling the first to third switching circuits based on a DC voltage being detected by the voltage detection circuit, wherein a voltage of the second DC power supply is becoming lower than a voltage of the first DC power supply, in an output mode where charge operation is performed to the second DC power supply and an AC output voltage is outputted from the AC voltage input/output terminals based on a DC input voltage being provided from the first DC power supply, the control section controls the first switching circuit so as to perform DC/AC conversion operation based on the DC power supply being detected by the voltage detection circuit, controls the second switching circuit so as to perform rectification, and controls the third switching circuit so as to perform DC/AC conversion operation, and in an input mode where charge operation is performed to at least one DC power supply between the first and second DC power supplies based on an AC input voltage being inputted from the AC voltage input/output terminals, the control section controls the third switching circuit so as to perform AC/DC conversion operation, controls the second switching circuit so as to perform DC/AC conversion operation based on the DC power supply being detected by the voltage detection circuit, and controls the first switching circuit so as to perform rectification.

2. The switching power supply unit according to claim 1: wherein the control section controls the switching circuits such that the third switching circuit further performs power-factor improvement in the input mode.

3. The switching power supply unit according to claim 1: in the input mode, the control section controls each switch in the second switching circuit so as to perform switching operation with a variable pulse width, and controls each switch in the first switching circuit so as to perform switching operation with a fixed pulse width, and by performing a pulse width modulation control to each switch, the control section adjusts a charge level of the first DC power supply.

* * * * *